Patented May 15, 1923.

1,455,485

UNITED STATES PATENT OFFICE.

WILLIAM C. GROVE, OF BASIC, VIRGINIA.

MEDICAL COMPOUND.

No Drawing. Application filed July 26, 1922. Serial No. 577,747.

*To all whom it may concern:*

Be it known that I, WILLIAM C. GROVE, a citizen of the United States, residing at Basic, in the county of Augusta and State of Virginia, have invented certain new and useful Improvements in Medical Compounds, of which the following is a specification.

This invention relates to compounds for use in the treatment of diabetes consisting of the following ingredients arranged preferably in the proportions stated below, namely *Tephrosia virginiana* (ground roots) 9 ounces, lithii citras 1 ounce, powdered cinnamon 30 grains, cochineal 3 grains, alcohol 2 ounces, and water 16 ounces.

In preparing this remedy, the roots of the herb *Tephrosia virginiana* dried and powhered are boiled with one pint of water for a period of about one hour and the decoction is then cooled and strained. The other ingredients are then added and the compound is allowed to stand for two days. It is then filtered and bottled. The compound is to be taken internally and under ordinary circumstances a dose of two teaspoonsful every three hours.

The principal ingredient of this remedy is *Tephrosia virginiana* or goat's rue. There is very little known about goat's rue or *Tephrosia virginiana* as a drug in the treatment of disease. There are, however, faint suggestions from one source and another that lead us to believe that there is in this drug some active principle which has yet to be isolated and which has material and specific effects on certain pathological conditions. As far back as 1873 Gillette-Damitte stated that when this plant was fed to cows it would increase secretion of milk from 30% to 50%. Millbank and Carren have affirmed that goat's rue is a powerful galactagogue and has been used in malignant fevers, plague, snake bites, worms, etc. See the 19th edition of the United States Dispensatory. The root of *Tephrosia virginiana* is said to be diaphoretic and powerfully anthelmintic. The Indians used this root as a vermifuge. It is given in decoction, the roots are slender, long and matty, are tonic and aperient.

It has been found in the actual treatment of diabetes with this composition that where the patients in some cases show a sugar content as high as 12% with Fehling's test that there was a marked reduction in sugar after the third week and that this continued throughout the treatment. In the test conducted by me there has been an approximate average reduction of over 75%. This formula not only reduces the sugar content of the urine but insipidity was reduced as much. The remedy has a pleasant diaphoretic effect which is obviously an advantage in the treatment of diabetes. It is impossible to say whether the drug acts on the sugar centers from the brain or corrects directly the pathological kidney or metabolic process. If this remedy acts as a powerful galactagogue, it is possible that the same active principle finds like principle in restoring the kidney cells to their normal state.

The next most important ingredient of the remedy is a lithia salt preferably lithii citras. This is so well known in medicine that it is not believed necessary to discuss it, as its properties as a solvent and diuretic would naturally place it in this formula as an adjuvant in the treatment of diabetes. The dropsical tendency in diabetes is relieved by the administration of this lithii citras and with the goat's rue makes an ideal combination. The citrate was selected over other lithia salts because of its solubility and because it is less irritating to the stomach and intestinal tract and less disagreeable to the taste than other lithia salts. Lithum bromide and other salts all have some objectionable, disagreeable action, as their names would imply, whereas lithum citrate is the one solvent of lithia that can be taken in this formula over a long period of time without producing untoward symptoms. The carbonate of lithia could be used, but this is more irritating to the mucous membrane of the stomach than the citrate of lithia. Lithia is a very material help to the action of the goat's rue in the treatment of diabetes, and experience has shown me that they act much better when combined than when administered singly The third ingredient, as previously stated, is powdered cinnamon (*Cinnamomum zeylanicum*). Its medical properties are not great but it has a beneficial effect in this formula, inasmuch as it acts in conjunction with the other drugs to provide a grateful and efficient aromatic. It is warm and cordial to the stomach, carminative, and this feature is particularly desirable in the treatment of diabetes, as it slightly excites peristalsis and tends to relieve the distressed dropsical and flatulent condition found in most cases of diabetes. The astringent effect of the cinnamon is also of benefit under certain conditions.

The cochineal is used for its coloring matter, though it has in addition certain anodyne properties. The alcohol is used as a preservative and to help hold the drugs in solution. Water is used as a means to make up the volume of the dose so that it may be administered satisfactorily. It is also in this medium that the strength of the goat's rue is extracted and preserved. This formula has the drugs in it so balanced that they all work together with cumulative effect to bring out their individual characteristics stated above. My experience has shown me that the above formula will keep indefinitely without deterioration, cloudiness or precipitation.

While I believe from experiments and tests that a compound composed of the ingredients set forth in approximately the proportions set forth is particularly efficacious in the treatment of diabetes, I do not wish to be limited to the exact proportions stated, nor to the use of the particular lithia derivative stated, nor to the use of all of the ingredients stated, as it is obvious, for instance, that the formula might be changed in some respects without departing from the spirit of the invention and that other and more or less equivalent ingredients might be combined with goat's rue and a lithia derivative to form this compound.

I claim:—

1. A medical compound including a liquid preparation of *Tephrosia virginiana* and a lithia salt in solution, the *Tephrosia virginiana* being in such proportions as to cause the *Tephrosia virginiana* to reduce the sugar content in and insipidity of the urine and the lithia salt to activate as a solvent and diaphoretic.

2. A medical compound including a liquid preparation of *Tephrosia virginiana* and citrate of lithia in solution in such proportions as to cause the *Tephrosia virginiana* to reduce the sugar content in and insipidity of the urine and the lithia salt to activate as a solvent and diaphoretic.

3. A medical compound comprising a liquid preparation of *Tephrosia virginiana*, lithii citras, and cinnamon in such proportions as to cause the *Tephrosia virginiana* to reduce the sugar content in and insipidity of the urine, the lithia salt to activate as a solvent and diaphoretic, and the cinnamon to excite peristalsis and to relieve dropsical and flatulent conditions.

In testimony whereof I hereunto affix my signature.

WILLIAM C. GROVE.